United States Patent [19]

Bohren et al.

[11] Patent Number: 4,871,573
[45] Date of Patent: Oct. 3, 1989

[54] PRODUCT AND PROCESS FOR THE PRODUCTION OF A MILK POWDER

[75] Inventors: Hans-Ueli Bohren, Saint-Legier; Theo W. Kuypers, Richigen; Niklaus Meister, Grosshoechstetten, all of Switzerland

[73] Assignee: Nestec S. A., Vevey, Switzerland

[21] Appl. No.: 926,380

[22] Filed: Oct. 30, 1986

[30] Foreign Application Priority Data

Nov. 23, 1985 [EP] European Pat. Off. ........ 85114889.0

[51] Int. Cl.$^4$ ................................................ A23C 9/18
[52] U.S. Cl. ...................................... 426/588; 426/585
[58] Field of Search ................................ 426/588, 585

[56] References Cited

U.S. PATENT DOCUMENTS

| | | | |
|---|---|---|---|
| 2,558,528 | 1/1945 | Sharp | 426/588 |
| 2,966,409 | 12/1960 | Williams et al. | 426/588 |
| 3,078,167 | 2/1963 | Rice . | |
| 3,121,639 | 2/1964 | Bauer et al. . | |
| 3,241,975 | 3/1966 | Brochner | 426/471 |
| 3,278,310 | 10/1966 | Williams et al. | 426/588 |
| 3,810,765 | 5/1974 | Nagasawa | 426/588 |

FOREIGN PATENT DOCUMENTS

| | | | |
|---|---|---|---|
| 2077611 | 11/1973 | France . | |
| 2365295 | 5/1978 | France | 426/588 |
| 644251 | 4/1984 | Switzerland . | |
| 0971212 | 11/1982 | U.S.S.R. | 426/588 |
| 1280051 | 7/1972 | United Kingdom . | |
| 2095531 | 10/1982 | United Kingdom | 426/588 |

*Primary Examiner*—Donald E. Czaja
*Assistant Examiner*—Helen Pratt
*Attorney, Agent, or Firm*—Vogt & O'Donnell

[57] ABSTRACT

A milk powder having lactose in essentially crystallized form and from 20% to 30% fats by weight of dry matter of which from 20% to 90% are in the free state is produced by seeding a material of lactic origin with fine lactose crystals to initiate crystallization of lactose. A dispersion forms, fats are added, and the material is spray dried.

16 Claims, No Drawings

PRODUCT AND PROCESS FOR THE PRODUCTION OF A MILK POWDER

BACKGROUND OF THE INVENTION

This invention relates to a process for the production of a milk powder.

There are various known processes for the production of milk powders which, in the interests of simplicity, may be divided into two groups according to the characteristics which it is desired to give the powders.

A first group is concerned above all with maintaining the nutritional and organoleptic qualities of the starting milk and obtaining good keeping properties and, if desired, instantaneous reconstitution and dissolution in water. This requires a careful treatment, a low content of free fats, the presence of lactose generally in amorphous form and an aerated structure. Spray-drying processes generally satisfy these requirements apart from the instant quality which may be obtained in particular by a following agglomerating treatment. The powders obtained may be directly used.

A second group is more concerned with obtaining a compact structure, a high content of free fats and, if desired, an aromatic note emanating from the Maillard reaction.

Hitherto, it has only been possible to obtain these properties by the roller drying processes described, for example, in French patent no. 2 077 611 or British patent no. 1 280 051. The powders made in this way are intermediate products used in the preparation of sauces, desserts, biscuits, confectionery and chocolate goods.

Drying on rollers has certain disadvantages compared with spray-drying, namely: it is more onerous and more difficult to carry out to obtain powders having constant characteristics. In addition, the lactose is in amorphous form.

To overcome these disadvantages, it is necessary, for example according to Swiss Patent No. 644 251, to resort to the subsequent treatment on rollers in the presence of fats of a milk powder which has already been spray-dried.

SUMMARY OF THE INVENTION

The present invention seeks to obviate these disadvantages and to provide a milk powder having certain characteristics of roller-dried powders, more especially a high content of free fats, but the lactose in crystallized form by a process which does not have any of the drawbacks associated with that technique.

Accordingly, the present invention relates to a process for the production of a milk powder containing, by weight of dry matter, from 20 to 30% fats of which from 20 to 90%. are in the free state and in which the lactose is essentially in crystallized form from starting materials of essentially lactic origin and, optionally, a reducing sugar, characterized in that these starting materials are dried by spray-drying.

In the context of the invention, the expression "free fats" means that the fats are not coated with protective materials, for example emulsifiers or proteins. In the present specification, the percentage of free fats is determined by gravimetric measurement of the quantity of fats extractable by a solvent, for example petroleum ether, after elimination of the solvent, based on the total quantity of fats.

The starting materials of essentially lactic origin which may be used are whole milk or skimmed milk (fresh or reconstituted from powders), cream, anhydrous milk fats or even fractions of anhydrous milk fats.

DETAILED DESCRIPTION OF THE INVENTION

In a first, preferred embodiment, skimmed fresh milk is heat-treated in the presence of a reducing sugar, for example glucose, and preferably a stabilizing salt which promotes the Maillard reaction.

To this end, the mixture is heated at 60°–150° C. for a few seconds to 30 minutes and preferably at around 120° C. for about 2 minutes. Depending on the treatment time and temperature, this heat treatment either results in simple pasteurization or promotes the Maillard reaction which produces a more or less accentuated caramelized flavour. The quantity of reducing sugar added, preferably in the form of an aqueous solution containing from 50 to 80% by weight of glucose, corresponds to 10–20% by weight of milk solids. The stabilizing salt used is preferably disodium hydrogen phosphate dihydrate which is added in a quantity of preferably 0.3 to 0.5% by weight, based on dry matter.

In a variant of this first embodiment where the starting material is skimmed fresh milk, neither reducing sugar nor stabilizing salt is added to the milk before the heat treatment. Accordingly, the heat treatment is reduced to simple pasteurization.

After the heat treatment, the solution is concentrated, for example by evaporation in a falling-film evaporator, to 30–60% and preferably about 50% by weight dry matter, and the concentrate subsequently is cooled to a temperature below 40° C. and preferably to a temperature of 5°–35° C.

The following step comprises seeding the cooled concentrate with lactose crystals and promoting crystallization of the lactose in the form of fine crystals. The lactose used for seeding must be in the form of fine crystals of which the dimensions are preferably below or equal to 2 μm. The quantity of lactose added should be sufficient to initiate crystallization, for example approximately 0.05% by weight, based on dry matter. Crystallization may be carried out in double-jacketed tanks, preferably at a temperature below 40° C., for 30 mins. to 30 h. and preferably for around 5 h., advantageously with slow and continuous stirring.

The dispersion obtained is then cooled to 0°–20° C. and preferably to around 5° C. In this embodiment, the milk fats are added to the cooled dispersion, preferably in the form of cream containing 10–50% and preferably around 36% by weight fats which itself is advantageously cooled to 0°–20° C. and preferably to around 5° C. The cream will advantageously have been sterilized or, preferably, pasteurized at 63°–140° C. for a few seconds to 30 mins. and then homogenized at 5°–80° C. and preferably at around 50° C. under a pressure of from 20 to 500 bar and preferably under a pressure of around 100 bar in a single step or in two steps, advantageously under a pressure of around 100 bar in the first step and under a pressure of around 20 bar in the second step. The mixture contains 40–50% by weight dry matter.

The mixture is then sprayed under a pressure at the nozzle of 60–100 bar and at a temperature preferably below or equal to 20° C. into a drying tower where it meets a stream of very hot air under pressure so that the temperature of the exit air is above or equal to 80° C.

In one particular embodiment of the spray-drying process, the concentrate and more especially the fats present therein may be protected against the oxidation which could occur during drying. To this end, an inert gas, preferably nitrogen, may be injected into the concentrate before it is sprayed.

Alternatively, a fat-soluble, preferably natural, antioxidant, for example a mixture of tocopherols, may be added in a quantity of from 100 to 200 ppm (parts per million) by weight to the concentrate before it is sprayed.

In this preferred embodiment, all the measures taken, namely crystallization of the lactose in the form of fine crystals, addition of highly homogenized cream, cooling of the concentrate and cold spraying thereof, preferably under high pressure at a temperature of 5° to 20° C. into a stream of very hot air, advantageously contribute towards obtaining a maximum of free fats and crystallized lactose and keeping the fats and the lactose in their respective states.

After drying, the powder has a moisture content of 1 to 5% and preferably less than 3% by weight. The lactose is in the form of crystals 10 to 70 μm in size.

In a second embodiment, the starting material for the treatment is whole fresh milk as opposed to skimmed milk and the milk fats are added just before spraying. In this embodiment, it is important that the solution be concentrated to at least 50% dry matter during evaporation so as suitably to promote crystallization of the lactose. The other steps of the process are similarly carried out.

The starting material for the treatment may also be partially skimmed milk to which the milk fats may be added in any step of the process, but preferably just before spraying, for example in the form of anhydrous milk fats or a fraction of anhydrous milk fats, so that the powder corresponds to a whole milk powder.

Whatever variant is used, flavouring agents selected according to the applications envisaged for the powder may of course be mixed therewith before or after drying. Preferably, the powder is placed in bags in an inert atmosphere, for example of nitrogen, the bags are sealed and are then stored, preferably at a temperature below 10° C.

The powder prepared in accordance with the invention may be used as an intermediate product in the manufacture of various food products, for example sauces, desserts, ice creams, confectionery and chocolate goods.

The invention is illustrated by the following Examples in which the percentages and parts are by weight unless otherwise indicated.

EXAMPLE 1

10.45 parts of glucose in the form of a syrup having a dry matter content of 50% are added with continuous stirring at a temperature of 40° C. to a quantity of skimmed milk corresponding to 62.3 parts of non-fat solids. 0.3 part of disodium hydrogen phosphate dihydrate in the form of an aqueous solution having a dry matter content of 10% is then added to the mixture. The whole is then heated to 80° C. by a tube heat exchanger and subsequently brought to 120° C. by direct injection of steam under a pressure of 3 bar, kept at that temperature for 2 minutes and then concentrated to 45% dry matter in a falling-film evaporator. The concentrate is then cooled to 35° C. by a tube exchanger, seeded with 0..05 part of lactose crystals below or equal to 2 μm in size and then kept at that temperature for 5 h. with continuous stirring. The seeded concentrate is then cooled to 5° C.

To the above dispersion are added 23.9 parts of fat milk solids in the form of cream containing 36% fats which has been pasteurized for 15 s at 90° C. and then homogenized in a two-stage homogenizer under respective pressures of 100 and 20 bar and at a temperature of 50° C., followed by cooling to 5° C.

The mixture containing 45% dry matter is then sprayed under a pressure of 75 bar by means of a high-pressure pump into a drying tower where it meets a stream of air under a pressure of 0.16 bar (1600 mm $H_2O$) and at a temperature of 350° C. On leaving the tower, the air has a temperature of 85° C. and a relative humidity of 15%.

The powder collected at the bottom of the tower has a moisture content of 2.5% and a specific gravity of greater than 500 g/l It contains 24.8% fats of which 79% are in the free state. (The percentage of free fats is determined as described earlier on.) The lactose is in the form of 10 to 70 μm crystals.

EXAMPLE 2

The procedure is as in Example 1 except that the cream is homogenized at 10° C. before being cooled to 5° C. and mixed with the dispersion The powder obtained has a moisture content of 0.5% and a specific gravity of 515 g/l. It contains 24.8% fats of which 69.5% are in the free state (determined as described above). The lactose is in crystallized form.

EXAMPLE 3

The procedure is as in Example 1, except that, before spraying, 4 l/min. nitrogen under approx 3 bar are injected into the concentrate, after which the gasified concentrate is delivered to the spray nozzle by means of a pump.

EXAMPLE 4

The procedure is as in Example 1, except that 100 ppm of a mixture of tocopherols are added to the concentrate before spraying.

EXAMPLE 5

The procedure is as in Example 1 using a quantity of whole milk corresponding to 64.3 parts of non-fat solids for 21.6 parts of fats to which are added 10.8 parts of 50% glucose syrup and 0.3 part of 10% disodium hydrogen phosphate dihydrate.

The steps of preheating, heating, cooling, concentration, crystallization of the lactose and drying are similar to those of Example 1. The only difference is the degree of concentration in the falling-film evaporator which is 50%. There is no addition of cream.

The powder obtained has a moisture content of 2.7% and a specific gravity of 500 g/l. It contains 24.1% fats of which 24% are in the free state (determined as indicated above). The lactose is in crystallized form.

EXAMPLE 6

The procedure is as in Example 3, except that the concentrate containing the crystallized lactose is homogenized in a two-stage homogenizer at 10° C. under respective pressures of 50 bar and 10 bar.

The powder obtained has a moisture content of 2.6% and a specific gravity of 460 g/l. It contains 24.1% fats of which 29% are in the free state (determined as indicated above). The lactose is in crystallized form.

EXAMPLE 7

The procedure is as in Example 1, except that 72.7 parts skimmed milk are pasteurized for 10 s at 120° C. without addition of glucose or disodium hydrogen phosphate dihydrate.

The powder contains 24.8% fats of which 79% are in the free state (determined as indicated above) and lactose crystallized form.

It has a more neutral taste than the powders of the preceding Examples which are slightly caramelized.

EXAMPLE 8

Cream sauce

A powdered cream sauce is prepared by dry-mixing various ingredients in the following proportions:

| Ingredients | % based on dry matter |
| --- | --- |
| Milk powder prepared as described in Example 7 | 34 |
| Skimmed milk | 15 |
| Animal and vegetable fats | 8 |
| Wheat flour and binders | 21 |
| Vegetable hydrolyzates and yeast extracts | 10.5 |
| Sodium chloride | 3 |
| Sodium glutamate | 2 |
| Flavourings, spices | 6.5 |

183.3 g of this mixture are mixed with 1 liter of lukewarm water and the whole is cooked over a strong flame for 3 mins. with vigorous stirring The sauce mixes very rapidly without forming clumps.

EXAMPLE 9

Caramel dessert

The following ingredients are dry-mixed in the proportions indicated:

| Ingredients | % based on dry matter |
| --- | --- |
| Milk powder prepared as described in Example 1 | 21 |
| Icing sugar | 67.6 |
| Corn starch (50% pregelatinized) | 9.7 |
| Gelling agents (carob bean flour, carragenate) | 1.3 |
| Coloring and caramel flavouring | 0.22 |
| Sodium chloride | 0.18 |

350 g of the mixture are mixed with 1 liter of cold water and the whole is cooked for 2 mins. The hot liquid is then poured into moulds and left to cool therein for 4 h.

EXAMPLE 10

Ice cream

A vanilla ice cream mixture is prepared from the following ingredients in the proportions indicated:

| Ingredients | % |
| --- | --- |
| Milk powder prepared as described in Example 7 | 17 |
| Butter | 5 |
| Sugar | 14 |
| Glucose syrup | 3.5 |

| Ingredients | % |
| --- | --- |
| Stabilizer, emulsifier | 0.5 |
| Coloring | 0.1 |
| Vanilla flavouring | 0.2 |
| Water | 59.7 |

The above ingredients apart from the flavouring and coloring are mixed with stirring in a tank, pasteurized, homogenized, degassed, cooled with cold water and then brine to a temperature of 0° C., followed by addition of perfume and flavouring. The mixture is frozen and then whipped in a freezer.

EXAMPLE 11

Milk chocolate 25 parts of the powder prepared as described in Example 1, of which the particles have a mean size of 20 $\mu$m, are mixed in a conch with 43 parts of finely ground sucrose (mean particle size 15 $\mu$m), 15.5 parts cocoa butter, 12 parts cocoa liquor, 0.2 part lecithin and 0.02 part vanillin. The mixture is conched, tempered, poured into moulds and the chocolate conventionally removed from the moulds.

Compared with chocolates made from roller-dried milk powder, the chocolate has a slightly caramelized note, a less sticky textured and a creamier taste.

We claim:

1. A process for producing a milk powder having lactose is essentially crystallized form and from 20% to 30% fats by weight of dry matter of which from 20% to 90% are in the free state comprising seeding a material of essentially lactic origin with fine lactose crystals in an amount sufficient for initiating crystallization of lactose from the material and thereby forming a dispersion, cooling the dispersion and maintaining it at a temperature at or below 20° C., adding milk fats to the cooled dispersion in an amount sufficient for forming a cooled mixture having a fat content of from 20% to 30% by weight dry matter, then spray drying the cooled mixture under conditions for maintaining the lactose in its crystalline state and for obtaining a powder having from 20% to 90% of the fats in the free state.

2. A process according to claim 1 wherein the material is skimmed milk and further comprising heat treating, concentrating and cooling the milk prior to seeding, and wherein the cooled mixture is dried by spraying from a nozzle under a pressure at the nozzle of from 60 to 100 bars and at a temperature at or below 20° C. into a drying tower where the cooled mixture meets a stream of hot air under pressure such that the temperature of exit air is at least 80° C.

3. A process according to claim 2 wherein the lactose crystals have dimensions equal to or below 2 $\mu$m and are added in an amount of about 0.05% by weight dry matter.

4. A process according to claim 3 wherein the heat treating is pasteurization.

5. A process according to claim 3 further comprising adding a reducing sugar to the skimmed milk prior to heat treating, and wherein the heat treating promotes a Maillard reaction.

6. A process according to claim 5 wherein the reducing sugar is glucose.

7. A process according to claim 5 further comprising adding a stabilizing salt to the milk and reducing sugar prior to heat treating.

8. A process according to claim 7 wherein the salt is disodium hydrogen phosphate dihydrate.

9. A process according to claim 1 wherein the material is whole milk and further comprising heat treating the milk, concentrating the treated milk to at least 50% dry matter, cooling the concentrated milk prior to seeding, and drying the cooled mixture by spraying from a nozzle under a pressure at the nozzle of from 50 to 100 bars and a temperature at or below 20° C. into a drying tower where the cooled mixture meets a stream of hot air under pressure such that the temperature of exit air is at least 80° C.

10. A process according to claim 9 wherein the lactose crystals have dimensions equal to or below 2° and are added in an amount of about 0.05% by weight dry matter.

11. A process according to claim 1 further comprising adding an inert gas to the material prior to drying.

12. A process according to claim 1 further comprising adding a fat-soluble antioxidant to the material prior to drying.

13. A process according to claim 12 wherein the antioxidant is a mixture of tocopherols.

14. A process according to claim 3 or 9 wherein the added milk fats are in the form of cream having from 10% to 50% by weight fats.

15. A process for producing a milk powder having lactose in essentially crystallized form and from 20% to 30% fats by weight of dry matter of which from 20% to 90% are in the free state comprising seeding partially skimmed milk with fine lactose crystals in an amount sufficient for initiating crystallization of lactose from the milk and thereby forming a dispersion, cooling the dispersion and maintaining it at a temperature at or below 20° C., adding milk fats to the milk in an amount sufficient to bring the fat content to from 20% to 30% by weight dry matter. and spray drying the dispersion under conditions for maintaining the lactose in its crystalline state and for maintaining from 20% to 90% of the fats in the free state.

16. The product of the process of claims 1, 3, 9 or 15 or 15.

* * * * *

UNITED STATES PATENT AND TRADEMARK OFFICE
CERTIFICATE OF CORRECTION

PATENT NO. : 4,871,573

DATED : October 3, 1989

INVENTOR(S) : Hans-Ueli BOHREN, et al.

It is certified that error appears in the above-identified patent and that said Letters Patent is hereby corrected as shown below:

Column 7, line 8, (line 6 of claim 9), "50" should read --60--.

Column 7, line 14, (line 2 of claim 16), "2°" should read --2μm--.

Column 8, line 16, (line 11 of claim 15), after "matter" change the period to a coma.

Column 8, line 21, (line 2 of claim 16), delete "or 15".

Signed and Sealed this

Thirty-first Day of July, 1990

Attest:

Attesting Officer

HARRY F. MANBECK, JR.

Commissioner of Patents and Trademarks